Jan. 17, 1961

H. C. EBERLINE 2,968,728

UNDERGROUND EXPLORATION APPARATUS

Filed Nov. 18, 1955

2 Sheets-Sheet 1

INVENTOR.
HOWARD C. EBERLINE

BY

ATTORNEY

Jan. 17, 1961     H. C. EBERLINE     2,968,728
UNDERGROUND EXPLORATION APPARATUS

Filed Nov. 18, 1955     2 Sheets-Sheet 2

INVENTOR.
HOWARD C. EBERLINE
BY

ATTORNEY

United States Patent Office 2,968,728
Patented Jan. 17, 1961

2,968,728
UNDERGROUND EXPLORATION APPARATUS

Howard C. Eberline, Santa Fe, N. Mex., assignor to Eberline Instrument Division of Reynolds Electrical and Engineering Co., Inc., Santa Fe, N. Mex.

Filed Nov. 18, 1955, Ser. No. 547,802

7 Claims. (Cl. 250—83.6)

This invention relates to subterranean exploration apparatus and more particularly to instruments using radioactive radiation to determine the location and the nature of underground formations.

The invention specifically relates to instruments and protective casings for the instruments adapted to be passed through underground bore holes, whether cased or un-cased, and attached to one end of cables which are connected to suitable recording devices at the surface of the ground for making a log or record of the radioactivity of underground formations in the proximity of the bore holes, such radioactivity measurements aiding in determining the nature of the earth or deposits through which the bore hole extends.

Previously, instruments have been devised for underground use, but they have been unsatisfactory for a number of reasons, some of which were: Inadequate waterproof protection; inadequate protection against shock; inaccessibility to the interior for inspection and repairs; not adaptable for use in making different types of measurements or logs; and inaccuracy when used with long conductor cables.

An object of this invention is to overcome the above enumerated defects of the prior instruments and to produce an instrument that can be economically manufactured and sold to the public in a single unit for making a number of different types of bore hole measurements.

Another object of this invention is to produce an instrument casing that will remain waterproof under extreme pressure and which may be readily opened for internal inspection or repair.

Another object of this invention is to provide a casing having provision for shock mounting of internal equipment to protect such equipment from injury and to prevent or reduce spurious readings.

Another object of this invention is to provide a casing with improved structure for attaching to the supporting annd conducting cable in order that the likelihood of loss under stringent conditions is reduced.

A further object is to provide a radioactive radiation detection device which may be operated at great distances from a power supply and recording instruments without any appreciable deleterious effects resulting from such distances.

Figure 2:
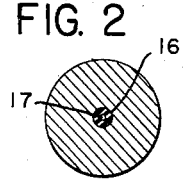
Figure 3:
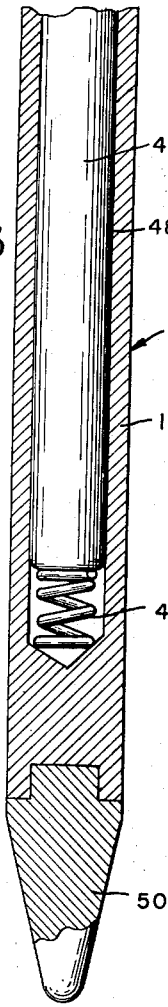
Figure 1:
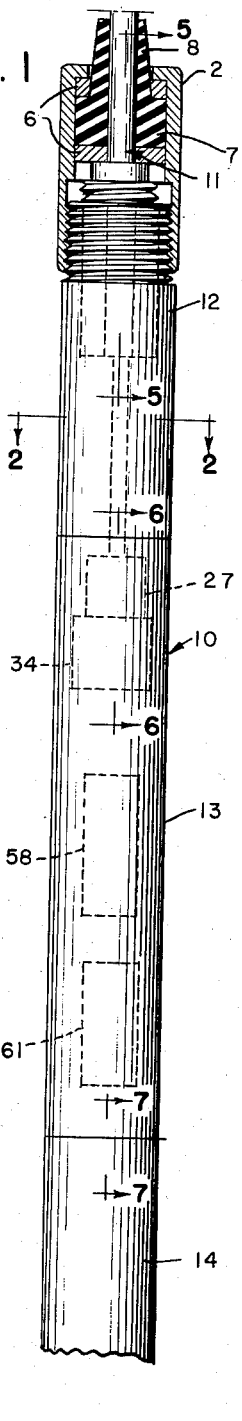
Figure 4:
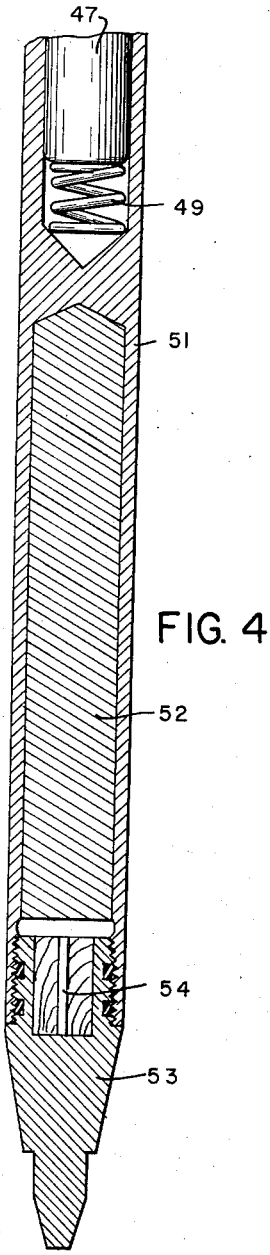
Figure 5:
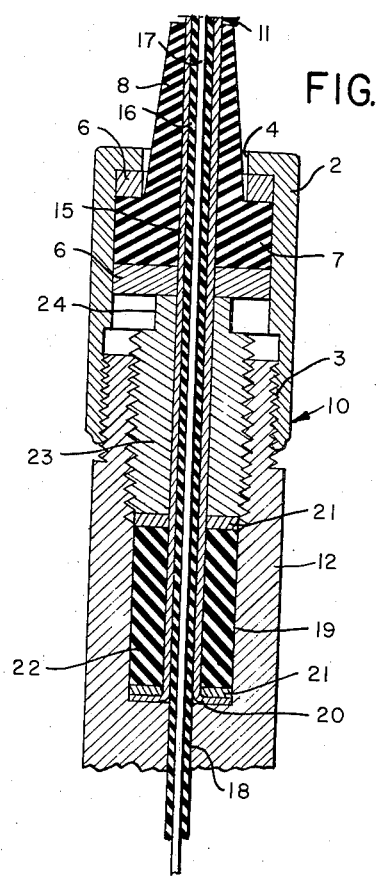
Figure 6:
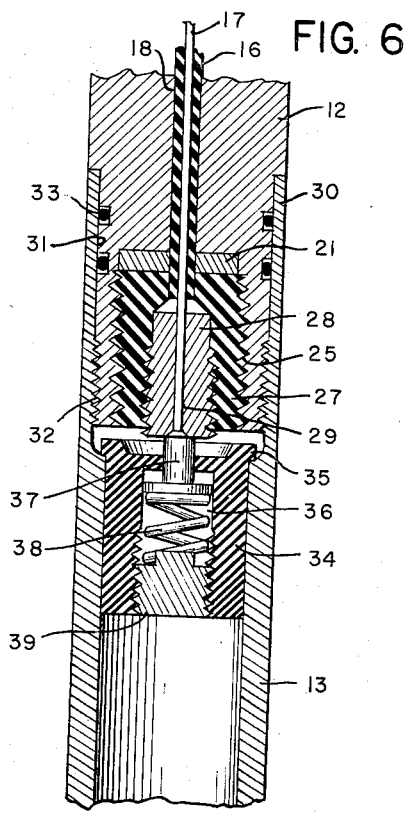
Figure 7:
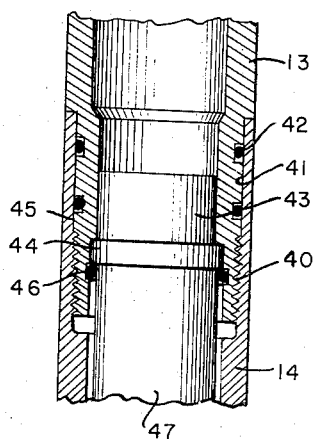

Other objects and advantages of the invention will be apparent from the following description taken in conjunction with the accompanying drawings wherein:

Fig. 1 is an elevation of the exploration instrument with the lower portion cut away;

Fig. 2, a sectional view taken on lines 2—2 of Fig. 1;

Fig. 3, a longitudinal section of the lower portion of the instrument;

Fig. 4, a longitudinal section of a modified lower portion adapted to be used with the instrument shown in Fig. 1;

Fig. 5, a broken sectional view taken on lines 5—5 of Fig. 1;

Fig. 6, a broken sectional view taken on lines 6—6;

Fig. 7, a broken sectional view taken on lines 7—7; and

Figure 8:
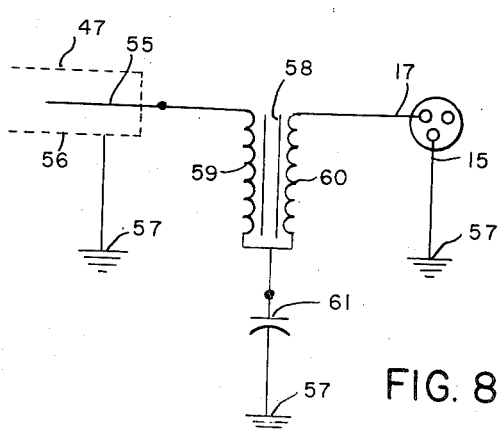

Fig. 8, a circuit diagram of the electrical components enclosed within the instrument casing shown in Fig. 1.

The present invention is adapted to be used within deep bore holes to determine the nature and location of underground formations in the proximity of the bore hole through the use of radioactivity measurements. One manner of the use of the instrument is to lower it through the bore hole keeping a continuous record of its depth and the intensity of natural radiation detected by it. The two measurements can be correlated to show the location of the intensity of and the changes of radioactivity level within the bore hole. These measurements are of value to a skilled operator in determining the nature of underground formations in the area of the bore hole. Another manner of using the subject invention is to place a primary source of gamma ray radiation such as radium within the instrument, and pass it through bore holes to measure the amount of scattered gamma rays occurring due to the application of the primary source of radiation.

Briefly, the invention comprises an underground exploration instrument consisting of a gamma ray radiation detector such as a Geiger counter with an intermediate matching transformer and capacitor enclosed within a waterproof and shockproof casing securely connected to the lower end of a supporting and conducting cable. A releasable connection is provided between the upper section of the casing and the remaining sections whereby the instrument containing sections can be readily disconnected from the cable. A further joint is provided for readily opening the casing for access to the Geiger counter tube and a still lower portion of the casing is adapted for access to a compartment adapted to contain the primary radiation source.

Referring to Fig. 1 of the drawing, a casing 10 is shown supported from a shielded cable 11 and having an upper section 12, an intermediate or transformer containing section 13 and a lower or Geiger counter enclosing section 14.

Referring to Figs. 1 and 5 of the drawings, a cap 2 having internal threads 3 and an opening 4 in its end is threaded on external threads 5 of the upper casing section 12. Spacer washers 6 are positioned within the cap 2 and a rubber or resilient sleeve 7 is supported between the spacers 6. The sleeve 7 has a longitudinally extending cone shaped portion 8 positioned within the opening 4 of the cap 2. The sleeve 7 further contains a longitudinal passage 9 to accommodate the cable 11 and to securely grip its outer surfaces when the cap 2 is tightened. The grip of the bushing 7 on the cable 11 can be adjusted by varying the thickness of the spacer washers 6.

With further reference to Fig. 5, the cable 11 consists of an outer braided shield 15 and an intermediate layer of heavy insulation 16 enclosing a central conductor 17. The upper casing section 12 is provided with a central passage 18 for the cable 11 with the passage 18 terminating in a well 19 which opens into the top of the section 12.

When installed the shielded portion 15 of the cable 11 is terminated with a flared end 20 at the bottom of the well 19. The flared portion of the shield is held against the bottom of the well by a brass washer 21 which in turn is held in place by an elongated resilient rubber bushing 22. A second brass washer 21 is positioned at the top of the bushing 22 and is held in place by an externally threaded sleeve 23 the upper end of the well 19 being internally threaded for receiving the sleeve 23. The upper end of the sleeve 23 has two gripping portions 24 by which it can be tightened within the well 19 thereby forcing the lower washer 21 securely against the flared portion 20 of the shield 11 and forcing the inner walls of the rubber bushing 22 to firmly grip the cable 11.

With further reference to Fig. 6, which illustrates the lower end of the upper section 12 and the upper end of the intermediate section 13, the central conductor portion 17 and the insulated portion 16 of the cable 11 is shown extended through passage 18 of the casing section 12, the lower end of the passage 18 opening into an internally threaded well 25. A third brass washer 21 is positioned at the bottom of the well 25 and held in place by an externally threaded insulating sleeve 27. The insulating sleeve 27 is also internally threaded to receive an externally threaded contact member 28 which has a central bore 29 to receive for soldering purposes the conductor 17 of the cable 11.

The intermediate section 13 is hollow and is adapted to enclose a transformer and a capacitor held in place by insulating material which is deposited within the container in a liquified condition and subsequently hardens to firmly grip the enclosed components and protect them against shock and moisture. A suitable material for this could be Scotch cast pouring resin J. The upper end of the section 13 has an enlarged hollow internal portion 30 adapted to fit over the lower end of the upper section 12. The portion 30 consists of a smooth surface 31 and a threaded surface 32. The lower end of the upper section 12 is reduced in diameter and has annular grooves for supporting elastic O-rings 33. Below the O-rings the reduced portion of section 12 is further provided with threads adapted to cooperate with the internally threaded surface 32 of section 13. When assembled, the surface 31 is in contact with the O-rings 33 thereby providing an effective seal against the entry into the casing of fluids, even under high pressure. However, as can be seen, the joint can be readily broken for access into the interior of the casing.

An insulating sleeve 34 is frictionally held within the upper end of the hollow portion of the intermediate section 13 and has shoulders 35 extending into the enlarged portion 30 adjacent the threaded surface 32. The lower end of the insulating sleeve 34 has an internal chamber 36 which holds a contact member 37, a spring 38, and a flat screw 39. The inner end of the chamber 36 opens into a smaller passage extending through the top of the sleeve 34. The contact member 37 has a shank adapted to extend through the central passage and an enlarged head for retaining it within the chamber 36. The spring 38 is positioned between the movable contact member 37 and the flat screw 39, the screw 39 holding the spring and contact member within the chamber 36. The flat screw 39 has threads which cooperate with the internal threads within the chamber 36 and is adapted to be soldered to the components enclosed within the hollow portions of section 13. The movable contact member 37 is spring pressed against the contact member 28 when the casing sections 12 and 13 are assembled.

Fig. 7 illustrates the lower end of the intermediate section 13 and the upper end of the lower section 14. The upper end of the lower section 14 is provided with an internally threaded surface 40 and an unthreaded surface 41 similar to the upper end of the section 13. The lower end of the section 13 is provided with external threads adapted to cooperate with the threaded surface 40 and annular grooves holding elastic O-rings 42 adapted to cooperate with the internal surface 41 in providing a sealed joint. This joint is similar to the joint disclosed in Fig. 6 between the upper section 12 and the intermediate section 13.

The lower end of the section 13 is provided with a tube socket 43 which has an enlarged shoulder 44 positioned against an internal shoulder 45 in the section 13. Below the shoulder 45, an annular internal groove receives a resilient retaining ring 46 which holds the socket 43 in position. Socket 43 is provided with the proper terminals to make contact with the components enclosed within the section 13. It is also provided with the proper connections to hold the Geiger counter tube 47 in position.

With further reference to Fig. 3, the lower section 14 has an internal hollow well 48 which encloses the Geiger counter tube 47 and a spring 49 located at its bottom for resiliently supporting the Geiger counter tube, thereby protecting it against shock. The lower end of the section 14 has a removable cap 50 made from Monel metal to protect the instrument from sustaining damage if it is dropped against hard materials such as rock during its use.

With further reference to Fig. 4, a modified lower section 51 is disclosed for use with the remainder of the instrument when making measurements that require a primary source of radiation. The upper part of the section 51 that encloses the Geiger counter tube 47 is identical with the Geiger counter enclosing portion of the section 14. However, immediately below the Geiger counter chamber is an elongated lead shield 52 adapted to absorb radiations directed upwardly from the primary source to the counter tube. The lower end of section 51 is internally threaded and receives a cap 53 which has externally cooperating threads and contains a chamber 54 for receiving a primary source of radiation. Cap 53 is also provided with annular grooves which receive elastic O-rings thereby efficiently sealing the chamber 54 from the outside.

With reference to Fig. 8, a circuit diagram is shown of the electrical components enclosed within the casing. The lower portion of the Geiger counter tube 47 is shown in dotted lines with a central electrode 55 and an outer electrode 56 which is grounded at 57. An iron core transformer 58 has a secondary winding 59 with its high side connected to the electrode 55 of the tube 47. The low side of the secondary winding 59 is connected to the low side of the primary winding 60 of the transformer. The high side of the primary winding 60 is connected to the conductor 17 of the cable 11, the shield 15 of the cable being connected to the ground 57. A capacitor 61 is connected between ground 57 and the common low sides of the transformer windings 59 and 60.

Using this circuit, direct current can be applied through the conductor 17 to the central electrode 55 of the Geiger counter tube 47, the transformer 58 offering little resistance to the D.C. flow. However, primary winding 60 of the transformer 58 terminates cable 17 with the proper low impedance whereas winding 59 of the transformer offers a proper high impedance to the Geiger counter tube 47.

The capacitor connected between ground and the low side of the transformer provides an A.C. path to ground while blocking out the flow of D.C. Due to this circuit the Geiger counter tube can be efficiently operated through extremely long lengths of cable with little reduction in signal strength due to the low impedance circuit of the cable.

Although this instrument is useful for oil exploration purposes, it is particularly designed for prospecting for other types of materials such as the rare metals so necessary to modern technology. These rare metals are found underground in small deposits sometimes having a thickness of only a foot or less.

Due to the relatively small dimensions of the deposits prospected for, the only previously known method of determining the specific location of such deposits was core drilling. Core drilling requires the use of a large hollow bit which drills a hole approximately four or five inches in diameter while leaving the core material of the hole intact for examination purposes. This method is highly expensive, however, and consequently of limited use.

Scattered gamma radiation is a function of the density and the fifth power of the atomic number of the elements within the materials measured. Consequently, as applicant's instrument is passed through a bore hole, an increase in the surrounding strata density or an increase in the average atomic number will cause a proportional increase in scattered gamma radiation. Due to the fact that the scattered radiation is a function of the fifth power of the atomic number, a small increase in atomic number will cause a considerable increase in the amount of scattered radiation. For this reason, applicant's method of exploration is highly sensitive to changes in strata and can be used to determine the specific location of small deposits of particular materials without the expense which accompanies core drilling.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. In a circuit for connecting a Geiger counter tube to a substantial length of low impedance transmission cable for transmitting power to said Geiger counter tube and for transmitting a signal from said Geiger counter tube, said cable containing a shield and a conductor, a transformer having a primary winding with its high side connected to said conductor and a secondary winding with its high side connected to said Geiger counter tube, the low sides of both the secondary and primary coils of said transformer being commonly connected, a suitable capacitor connected between said connection and ground which is common to the ground connection of said Geiger counter tube and the shield of said cable, said transformer offering a proper low impedance to said cable and a proper high impedance to said Geiger counter tube, the direct current for energizing said Geiger counter tube passing freely through said transformer.

2. Exploration apparatus for making surveys within underground bore holes by response to scattering gamma rays, or to radiation from the material around the bore, said apparatus including a casing, a transformer having high and low impedances, a capacitor having one of its plates connected to one terminal of each impedance, the other plate of said capacitor being connected to the casing and thereby to ground, a Geiger counter tube mounted in said casing, the other terminal of said high impedance being connected to the central electrode of said Geiger counter tube, the other terminal of said low impedance being connected through a cable to measuring apparatus, means externally of said casing for applying a bias voltage to the central electrode of said Geiger counter through said cable and impedances whereby radiation may be detected from the formation adjacent the casing, or radiation may be detected from a source of radiation within the casing impinging upon formations adjacent the casing for scattering radiation which may be detected in the Geiger counter tube.

3. A unit of small external dimensions for positioning in operative relation to a formation from which nuclear radiation may be measured, said unit comprising a Geiger counter, a transformer closely adjacent said Geiger counter having primary and secondary windings with one terminal of the primary and one terminal of the secondary connected together, a capacitor having one of its terminals connected to the connected said one terminals of the primary and secondary windings, the other terminal of the capacitor being connected to ground, the other terminal of the secondary winding being connected to the central electrode of the Geiger counter, the other terminal of the primary winding being connected to a lead of substantial length, said lead being connected to a source of electric power to charge the Geiger counter whereby radiation received by the Geiger counter will produce impulses in the lead which may be measured between such lead and ground.

4. The invention according to claim 3 in which the unit is encased in a fluid-tight casing of sufficient strength to withstand pressures obtained in a well.

5. The invention according to claim 4 in which a conductive shield is insulated from and surrounds said lead, said shield being electrically connected to said casing and serving as a continuous ground.

6. A probe head for use with a radiation detector tube and providing for the supply of power to the tube from a distant point comprising a housing, a radiation detection tube in the housing, a transformer having a primary winding with its high side connected to a conductor and a secondary winding with its high side connected to the radiation detector tube, the low side of both the secondary and the primary windings of the transformer being commonly connected, a suitable capacitor connected between said connection and ground which is common to the ground of the radiation detector tube and the shield of the cable, said transformer offering a proper low impedance to said cable and a proper high impedance to said radiation detector tube, the direct current for energizing said tube passing through said transformer.

7. The invention according to claim 1 in which the transformer and Geiger counter tube are mounted in a housing and the housing is sealed with O-rings between said sections thereof.

References Cited in the file of this patent

UNITED STATES PATENTS

| | | |
|---|---|---|
| 2,376,821 | Scherbatskoy et al. | May 22, 1945 |
| 2,385,857 | Herzog | Oct. 2, 1945 |
| 2,508,772 | Pontecorvo | May 23, 1950 |
| 2,515,535 | Thayer et al. | July 18, 1950 |
| 2,533,030 | Melman | Dec. 5, 1950 |
| 2,543,676 | Thayer et al. | Feb. 27, 1951 |
| 2,672,561 | Lichtman | Mar. 16, 1954 |
| 2,686,268 | Martin et al. | Aug. 10, 1954 |
| 2,709,753 | Krasnow et al. | May 31, 1955 |
| 2,711,483 | Herzog | June 21, 1955 |
| 2,712,081 | Fearon et al. | June 28, 1955 |
| 2,720,627 | Llewellyn | Oct. 11, 1955 |
| 2,727,155 | Herzog et al. | Dec. 15, 1955 |